United States Patent
Hui et al.

(10) Patent No.: US 9,935,868 B2
(45) Date of Patent: Apr. 3, 2018

(54) OPTIMIZING INTER-PAN TRAFFIC

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 631 days.

(21) Appl. No.: 14/549,681

(22) Filed: Nov. 21, 2014

(65) Prior Publication Data

US 2016/0134468 A1    May 12, 2016

Related U.S. Application Data

(60) Provisional application No. 62/076,713, filed on Nov. 7, 2014.

(51) Int. Cl.
*H04L 12/751* (2013.01)
*H04W 40/32* (2009.01)
*H04W 84/12* (2009.01)

(52) U.S. Cl.
CPC .............. *H04L 45/02* (2013.01); *H04W 40/32* (2013.01); *H04W 84/12* (2013.01)

(58) Field of Classification Search
None
See application file for complete search history.

(56) References Cited

U.S. PATENT DOCUMENTS

| 8,934,366 B2 | 1/2015 | Hui et al. | |
|---|---|---|---|
| 2004/0008691 A1* | 1/2004 | Winter | H04L 45/122 370/395.31 |

OTHER PUBLICATIONS

Winter et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Jeffrey R Swearingen
(74) *Attorney, Agent, or Firm* — Parker Ibrahim & Berg LLC; James M. Behmke; Stephen D. LeBarron

(57) ABSTRACT

In one embodiment, a device identifies inter-personal area network (PAN) traffic between a first PAN and a second PAN. The device identifies a network node in the first PAN associated with the inter-PAN traffic and determines that the network node should join the second PAN. The device causes the network node to join the second PAN, in response to determining that the network node should join the second PAN.

20 Claims, 15 Drawing Sheets

OPTIMIZING INTER-PAN TRAFFIC

RELATED APPLICATIONS

This application claims priority to U.S. Provisional Application No. 62/076,713, filed Nov. 7, 2014, entitled: "OPTIMIZING INTER-PAN TRAFFIC," by Hui et al., the contents of which are herein incorporated by reference.

TECHNICAL FIELD

The present disclosure relates generally to computer networks, and, more particularly, to optimizing traffic across different personal area networks (PANs).

BACKGROUND

Low power and Lossy Networks (LLNs), e.g., sensor networks, have a myriad of applications, such as Smart Grid Advanced Metering Infrastructure (AMI) and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Some LLN deployments, such as Smart Grid AMI deployments, may include upwards of millions of LLN nodes/devices. To account for the typically constrained nature of the various devices, mesh technologies (e.g., CG-Mesh, RFLAN, etc.) often divide the deployed devices into smaller sets, with each being serviced by a border router. Thus, the mesh network may be divided into any number of PANs, each PAN having a border router providing inter-PAN connectivity to the nodes in its local PAN.

PAN formation may be optimized based on various network metrics. For example, a node may join a given PAN based on the link metrics between itself and its neighbors (e.g., signal strength, packet loss, etc.), the overall path cost between itself and the border router, or other such factors. Accordingly, an LLN node typically favors joining a PAN that has fewer nodes, thereby reducing the overall path cost between the node and the border router of the PAN.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device identifies inter-personal area network (PAN) traffic between a first PAN and a second PAN. The device identifies a network node in the first PAN associated with the inter-PAN traffic and determines that the network node should join the second PAN. The device causes the network node to join the second PAN, in response to determining that the network node should join the second PAN.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
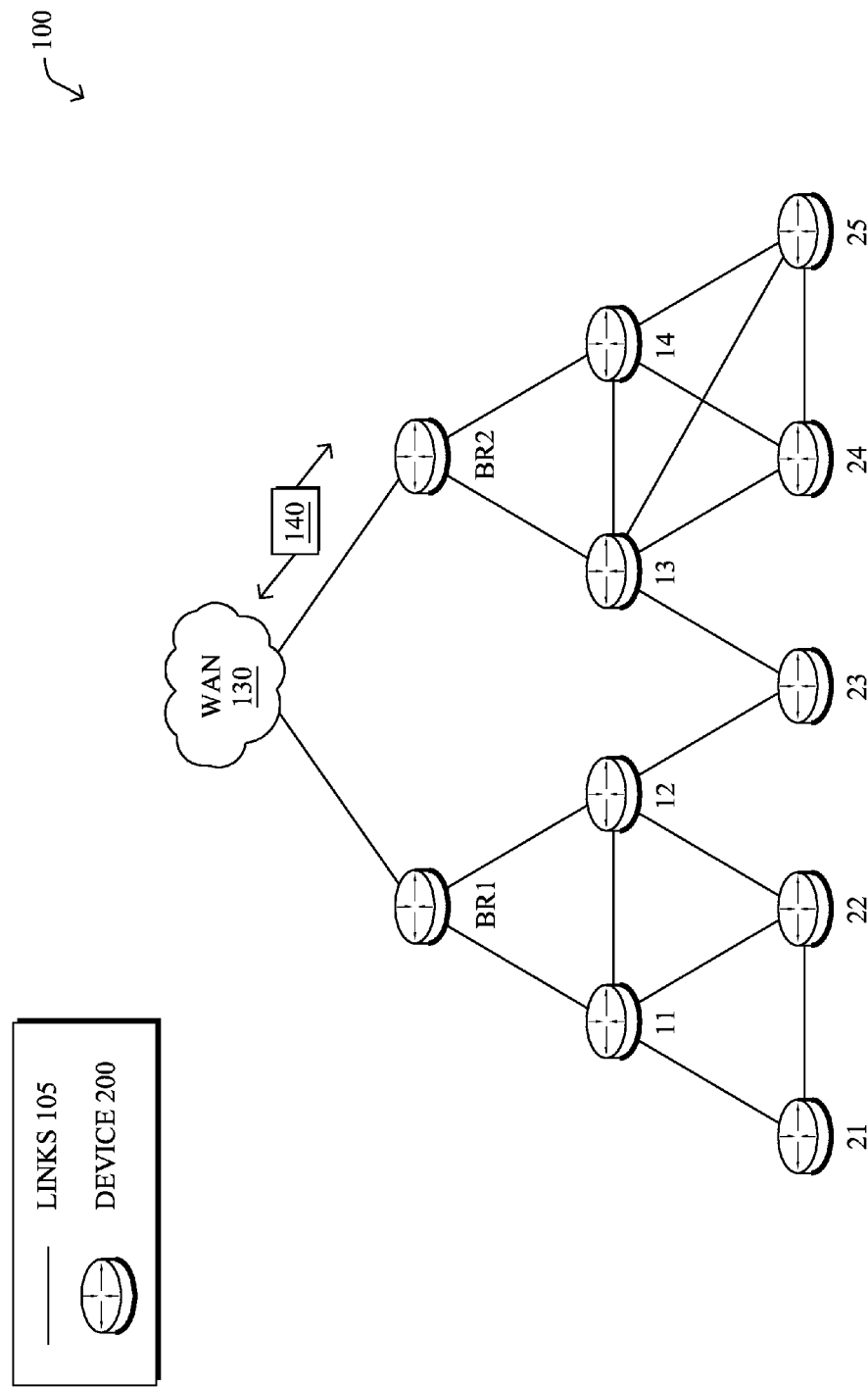
FIG. 1 illustrates an example communication network.

FIG. 1 is a schematic block diagram of an example computer network 100 illustratively comprising nodes/devices 200 (e.g., labeled as shown, border routers "BR1" and "BR2," nodes "11," "12," . . . "45," etc. and described in FIG. 2 below) interconnected by various methods of communication. For instance, the links 105 may be dedicated links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative border routers BR1 and BR2, such as field area routers (FARs), may interconnect the local networks with a WAN 130 via which BR1, BR2 may communicate with other devices such as management devices, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with certain "root" nodes, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
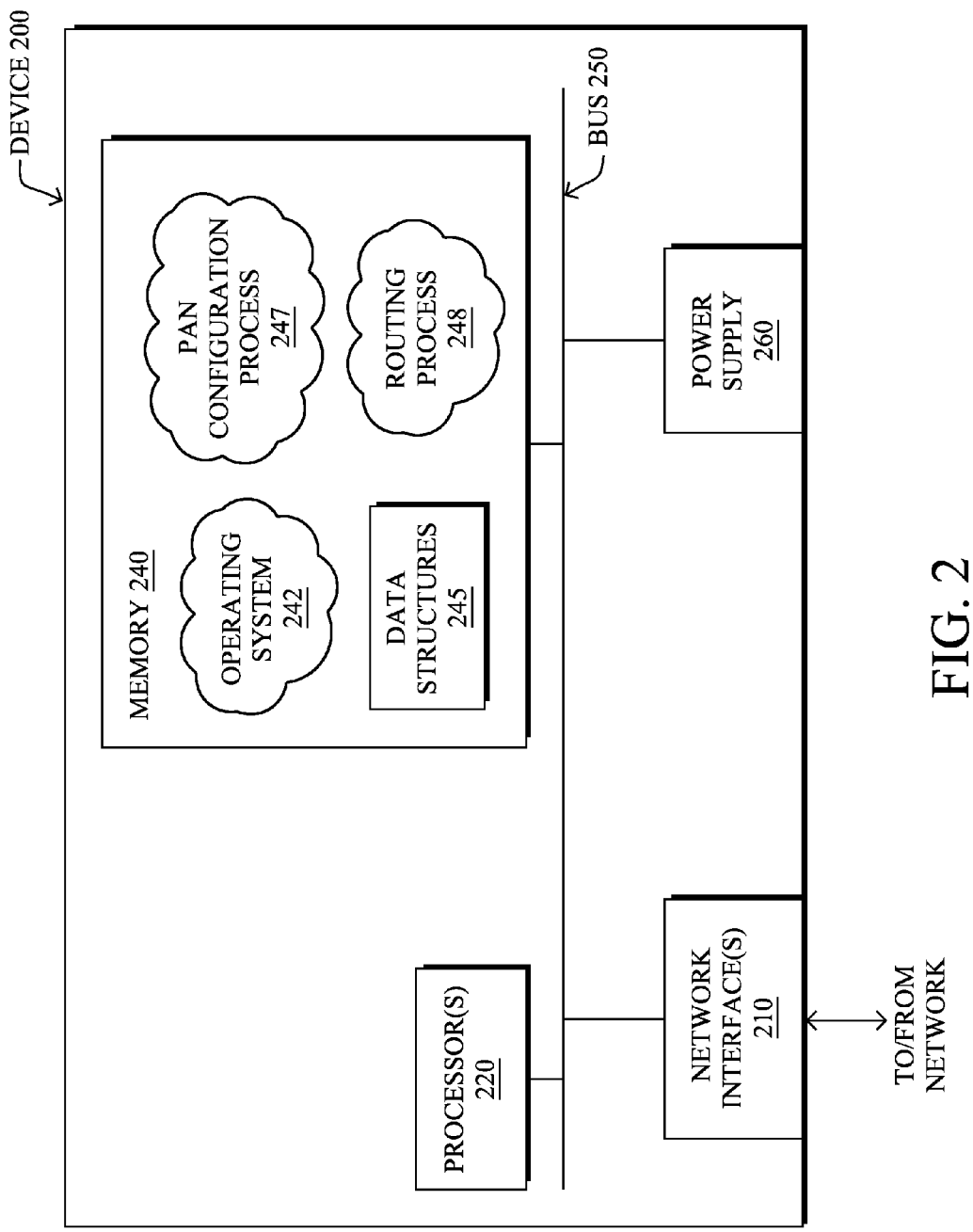
FIG. 2 illustrates an example network device/node.

FIG. 2 is a schematic block diagram of an example node/device 200 that may be used with one or more embodiments described herein, e.g., as any of the nodes shown in FIG. 1 above. The device may include one or more network interfaces 210 (e.g., wired, wireless, PLC, etc.), at least one processor 220, and a memory 240 interconnected by a system bus 250, as well as a power supply 260 (e.g., a battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations, the PLC signal may be coupled to the power line feeding into power supply 260.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic adapted to execute the software programs and manipulate the data structures 245. An operating system 242, portions of which are typically resident in memory 240 and executed by processor 220, functionally organizes the device by, inter alia, invoking operations in support of software processes and/or services executing on the device. These software processes and/or services may include routing process/services 248 and a PAN configuration process 247, as described herein. Note that while processes 247-248 are shown in centralized memory 240, alternative embodiments provide for the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 248 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

PAN configuration process 247 includes instructions that may be executed by processor 220 to perform the functions described herein with respect to PAN formation and configuration. For example, a given network node may execute PAN configuration process 247 to join or otherwise form a PAN. In further implementations, PAN configuration process 247 may be operable to analyze and optimize a PAN based on inter-PAN traffic generated and/or received by a node within the PAN.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from LLN devices towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by processes 247-248) based on an objective function (OF). The role of the OF is generally to specify rules on how to build the DAG (e.g. number of parents, backup parents, etc.).

Figure 3:
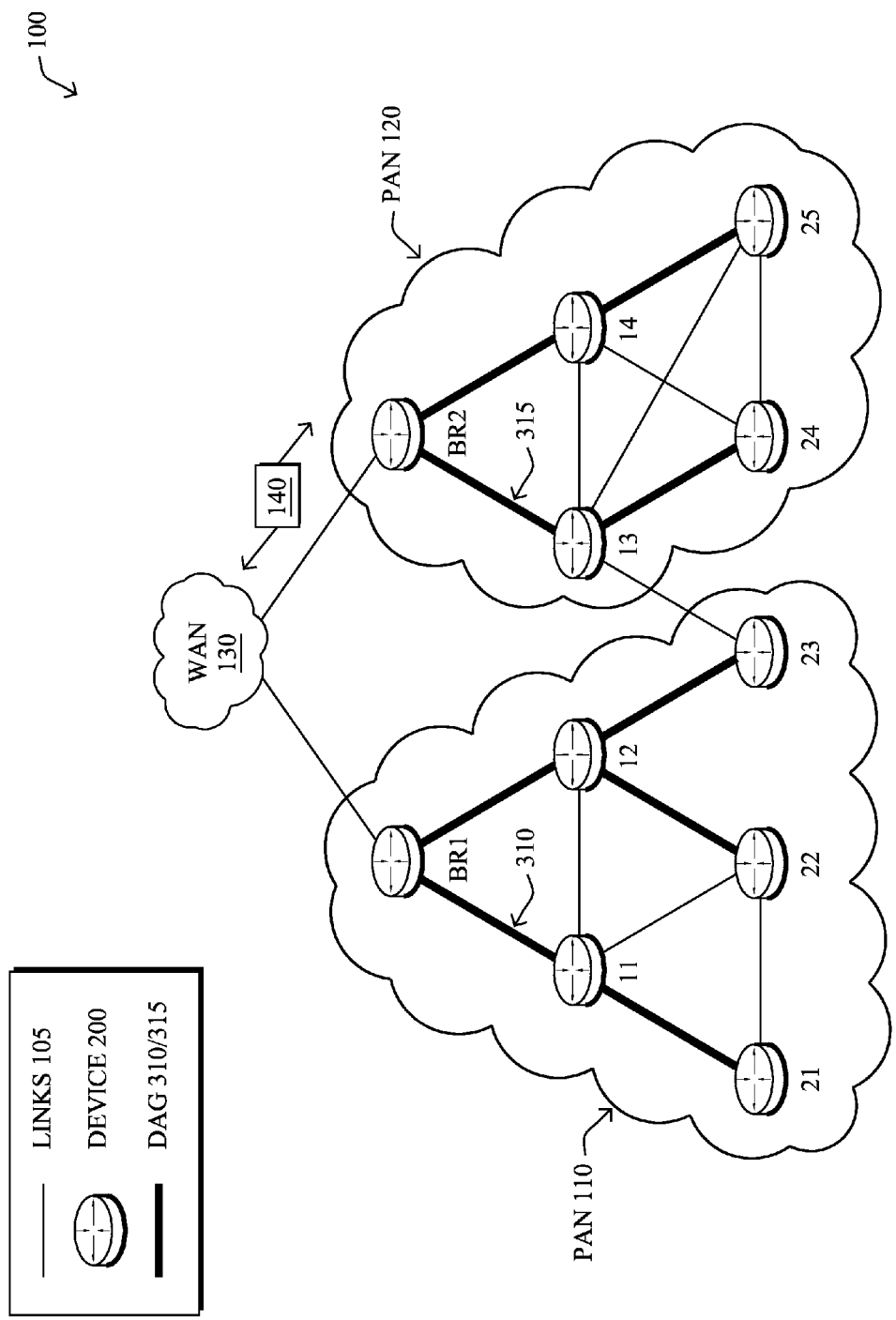
FIG. 3 illustrates an example of network nodes forming personal area networks (PANs)

FIG. 3 illustrates example simplified DAGs that may be created, e.g., through the techniques described above, within network 100 of FIG. 1. For instance, certain links 105 may be selected for each node to communicate with a particular parent (and thus, in the reverse, to communicate with a child, if one exists). These selected links form the DAGs 310, 315 (shown as bolded lines), which extends from the root nodes (e.g., border routers BR1 and BR2) toward one or more leaf nodes (nodes without children). Traffic/packets 140 (shown in FIG. 1) may then traverse DAG 310 or DAG 315 in either the upward direction toward the root or downward toward the leaf nodes, particularly as described herein.

Related to the formation of DAGs 310, 315 is the concept of a PAN. First, a PAN defines the scope of the link-layer group keys used by devices to secure their link frames. The group keys are shared to enable true broadcast communication. Second, a PAN defines the scope of the broadcast schedule. In particular, certain network implementations may utilize a channel-hopping architecture where each device defines its own channel-hopping schedule used for unicast communication, but overlays a broadcast schedule that is synchronized with all devices within a PAN. Each PAN has its own broadcast schedule.

As shown, each of nodes 11-25 may join a PAN headed by one of border routers BR1 or BR2, based on the reachability and/or path costs between a given node and a border router. For example, with CG-Mesh, devices join a PAN based on metrics included in IEEE 802.15.4 Enhanced Beacons. In general, LLN devices favor PANs that have fewer devices attached and reduce their path cost to a border router, which allows for a form of load balancing across PANs. Generally speaking, the primary goal of a node when joining a PAN is to find good connectivity to the WAN. For example, node 23 may be able to reach both BR1 and BR2, but elect to join PAN 110 over PAN 120, if the path cost to BR2 is higher than the path cost to BR1.

Border routers BR1, BR2 may operate as gateways for the network nodes within their respective PANs 110, 120 to a WAN 130, via which traffic to other servers, devices, PANs, etc. may be sent. Each of border routers BR1, BR2 may be used to convey intra-PAN traffic. For example, a message sent from node 21 to node 23 may traverse the following path: 21→11→BR1→12→23, in accordance with DAG 310. Similarly, border routers BR1, BR2 may also be operable to convey inter-PAN traffic between PANs 110, 120 (e.g., via WAN 130). For example, a message sent from node 11 to node 13 may traverse the following path: 11→BR1→WAN 130→BR2→node 13.

In certain applications (e.g., Smart Grid AMI applications, distributed automation applications, etc.), a small subset of related devices may routinely communicate with each other. Unlike the vast majority of traffic, these cases typically involve having IPv6 source and destinations in the LLN. In addition, the source and destination devices may be within spatial proximity of one another (i.e. 1 to 2 hops). For example, certain LLN devices may include sensors and actuators that communicate with one another to control an electric distribution network. Such a traffic pattern is sometimes referred to as point to point (P2P), in contrast with point to multipoint (P2MP) or multipoint to point (MP2P) traffic, which are typically found in LLNs.

LLN devices that rely on P2P communications (e.g., grouped devices that are part of a control system, etc.) may join different PANs, due to the various factors that affect how a given node selects a PAN to join (e.g., based on the optimal selection of a border router for the node). In such cases, however, communications sent between devices that are members of different PANs must travel first to the border router of the local PAN, into the WAN, back down to a different border router of a different PAN, and routed through the other PAN to the destination device. While the formed mesh network does provide connectivity to the nodes, the network configuration is also such that certain performance parameters of the network are not optimal. For example, a high volume of inter-PAN traffic between related nodes may increase latency, WAN traffic costs, and border router congestion. Further, long communication paths between related devices may also lead to an increase in the number of dropped packets, which may impact the underlying control process. Also notable is that P2P traffic is typically used in LLNs for critical traffic, such as in distributed automation applications, which may have higher performance requirements than regular network traffic.

Optimizing Inter-PAN Traffic

The techniques herein provide mechanisms whereby LLN devices that communicate directly with one another (e.g., as part of a group of related devices) join the same PAN. In some aspects, a border router may build and maintain a traffic matrix, to identify inter-PAN traffic that may be routed more efficiently through the mesh if the corresponding devices/nodes were members of the same PAN. In further aspects, the border router may instruct one or more nodes to join a different PAN, thereby reducing inter-PAN traffic.

Specifically, according to one or more embodiments of the disclosure as described in detail below, a device may identify inter-personal area network (PAN) traffic between a first PAN and a second PAN. The device may also identify a network node in the first PAN associated with the inter-PAN traffic and determines that the network node should join the second PAN. In response to determining that the network node should join the second PAN, the device causes the network node to join the second PAN.

Illustratively, the techniques described herein may be performed by hardware, software, and/or firmware, such as in accordance with PAN configuration process 247, which may include computer executable instructions executed by the processor 220 (or independent processor of interfaces 210) to perform functions relating to the techniques described herein, e.g., in conjunction with routing process 248. For example, the techniques herein may be treated as extensions to conventional protocols, such as the various PLC protocols or wireless communication protocols, and as such, may be processed by similar components understood in the art that execute those protocols, accordingly.

Figure 4A:
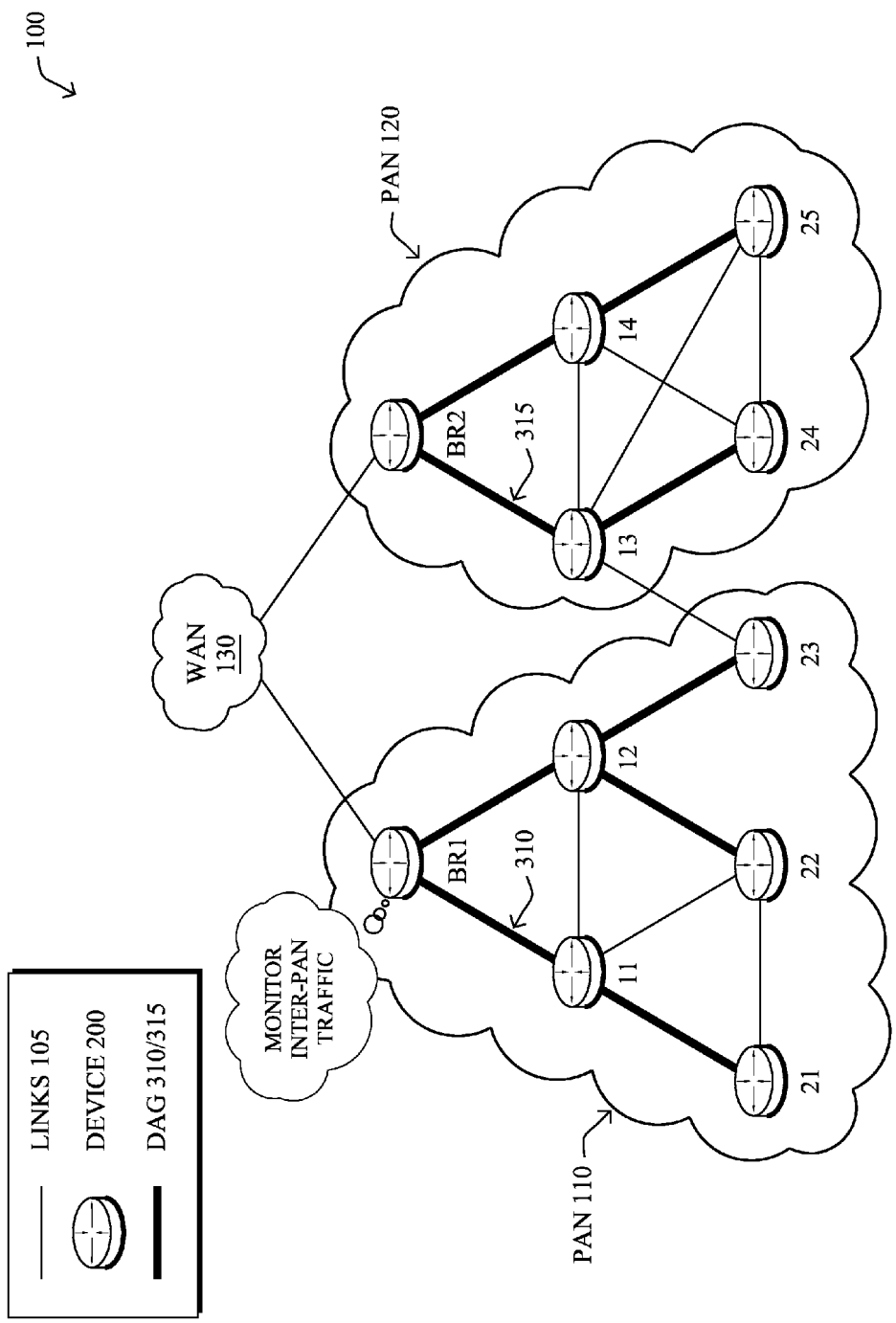
FIGS. 4A-4C illustrate a network device determining whether to initiate an inter-PAN node migration.

Operationally, a network device, such as a border router, may be configured to host and populate a lightweight traffic matrix (e.g., within data structures 245). Since inter-PAN traffic would systematically transit through a border router and the border routers store data regarding the respective topology of each PAN, the border router may be able to determine which of the critical P2P traffic effectively transits through the border router. For example, as shown in FIG. 4A, border router BR1 may monitor any inter-PAN traffic sent between nodes in PAN 110 and nodes in PAN 120 via WAN 130.

In some implementations, critical P2P traffic may be flagged as such or include an indication that a border router may otherwise use to identify the P2P traffic as being critical. For example, the border router may compare the received traffic to a traffic whitelist configured on the border router itself or on another network device in communication with the border router (e.g., a policy engine, etc.). Example indicators of critical traffic may include, but are not limited to, inter-PAN traffic marked with a DSCP class, the nth byte of the packets matching a known pattern, the UDP ports of the communicating nodes belonging to a list of known UDP ports associated with critical traffic (e.g., for use by distributed automation traffic), or the like.

According to various embodiments, a border router or other network device responsible for evaluating the performance of a local PAN may evaluate all inter-PAN traffic for possible PAN migration candidates. In another embodiment, only critical inter-PAN traffic may be evaluated. In another embodiment, the border router or other network device may trigger a PAN migration if the performance of any inter-PAN critical traffic crosses a performance threshold. For example, PAN migration may be triggered by the packet error rate of the traffic crossing a defined threshold. In some cases, the border router or other network device may be operable to perform deep packet inspection on any inter-PAN traffic and, based on the observed number of retransmissions, determine the packet error rate of the traffic. In another example, the device may inspect the traffic to determine the amount of latency of the traffic (e.g., by analyzing time stamped packets in the traffic) and determine whether the latency is outside of an acceptable performance range. In further implementations, the border router or other network device may download service level agreements (SLAs) for sensitive/critical applications (e.g., from an NMS) and trigger a PAN migration when the inter-PAN traffic does not satisfy the corresponding SLA.

Figure 4B:
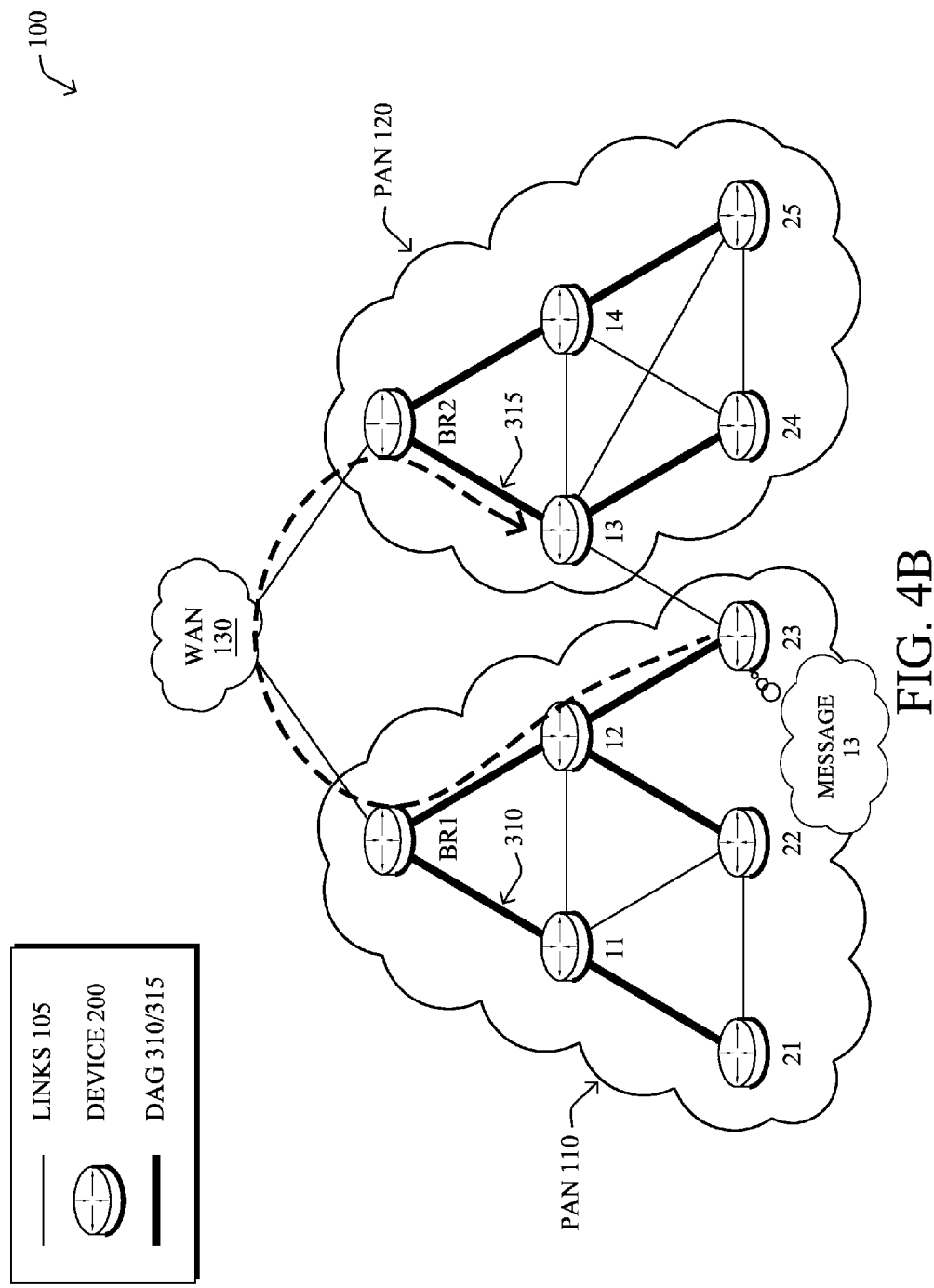
Figure 4C:
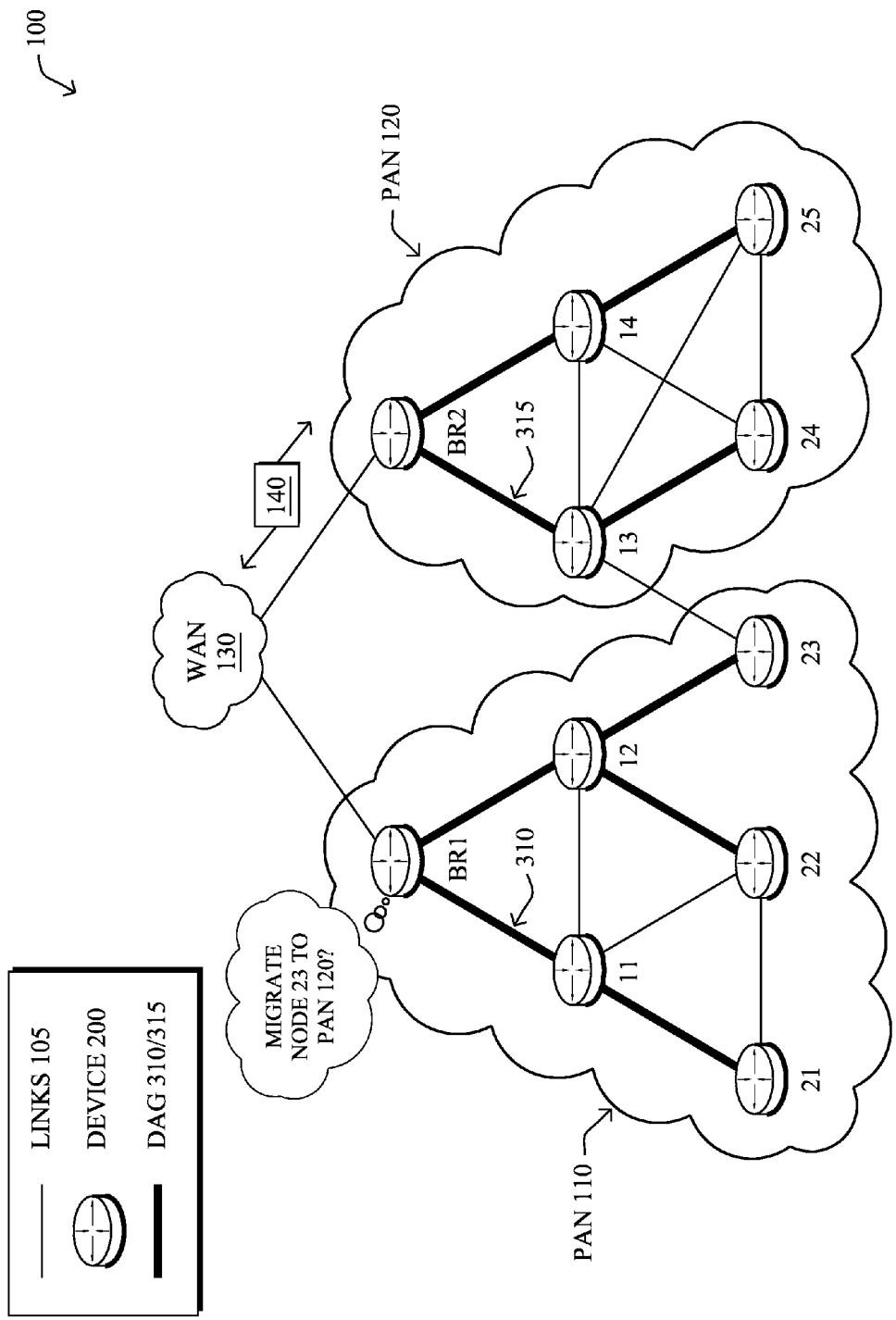

In one example, as shown in FIG. 4B, assume that node 23 in PAN 110 routinely sends messages 402 to node 13 in PAN 120 (e.g., node 23 is a sensor and node 13 is an actuator within the same control system, etc.). Thus, messages 402 pass through border routers BR1 and BR2 and into PAN 120, to reach node 13. Based on inter-PAN messages 402, border router BR1 may identify node 23 associated with inter-PAN messages 402 as a potential PAN migration candidate. As shown in the example of FIG. 4C, border router BR1 may then determine whether node 23 should be migrated from belonging to PAN 110 to PAN 120.

Figure 5A:
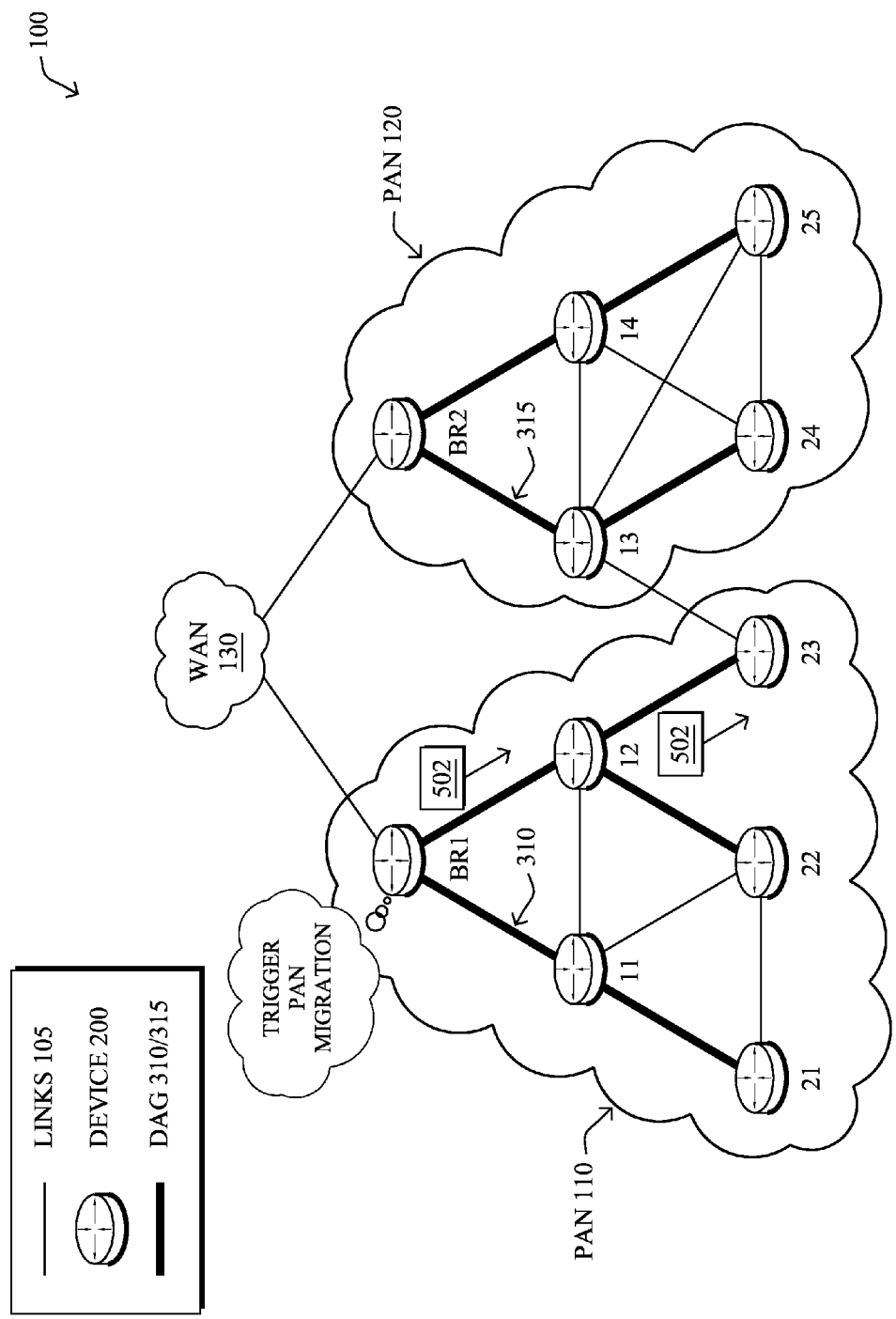
FIGS. 5A-5D illustrate an inter-PAN node migration.

Once the border router or other network device has determined which nodes are causing unnecessary inter-PAN traffic, the device may instruct individual nodes to join a different PAN. For example, as shown in FIG. 5A, border router BR1 may send a migration instruction 502 to node 23 that causes node 23 to leave PAN 110 and join PAN 120. Migration instruction 502 may be, in some embodiments, a custom CoAP message or similar message. Migration instruction 502 may, for example, include an identifier for PAN 120.

Figure 5B:
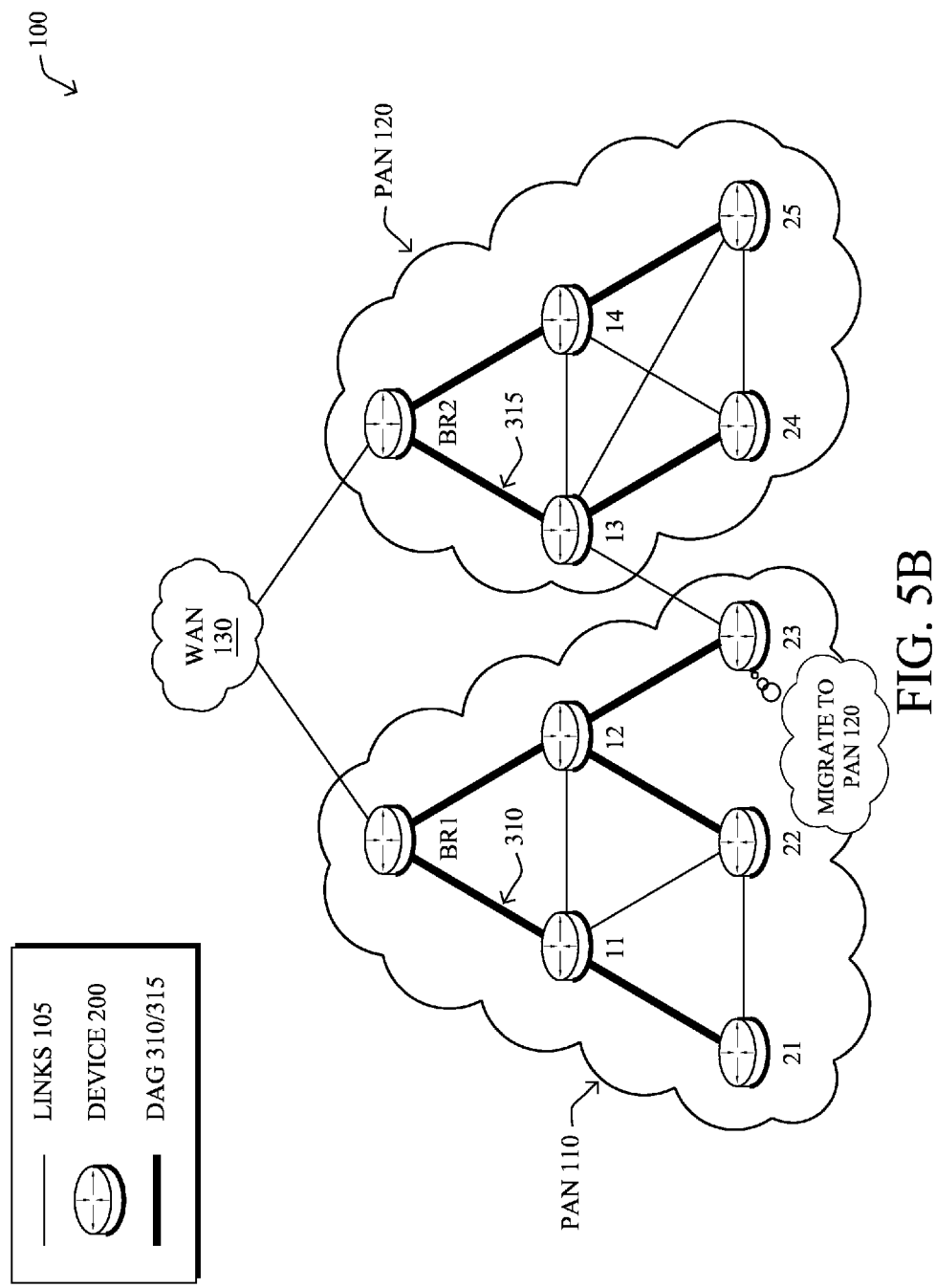
Figure 5C:
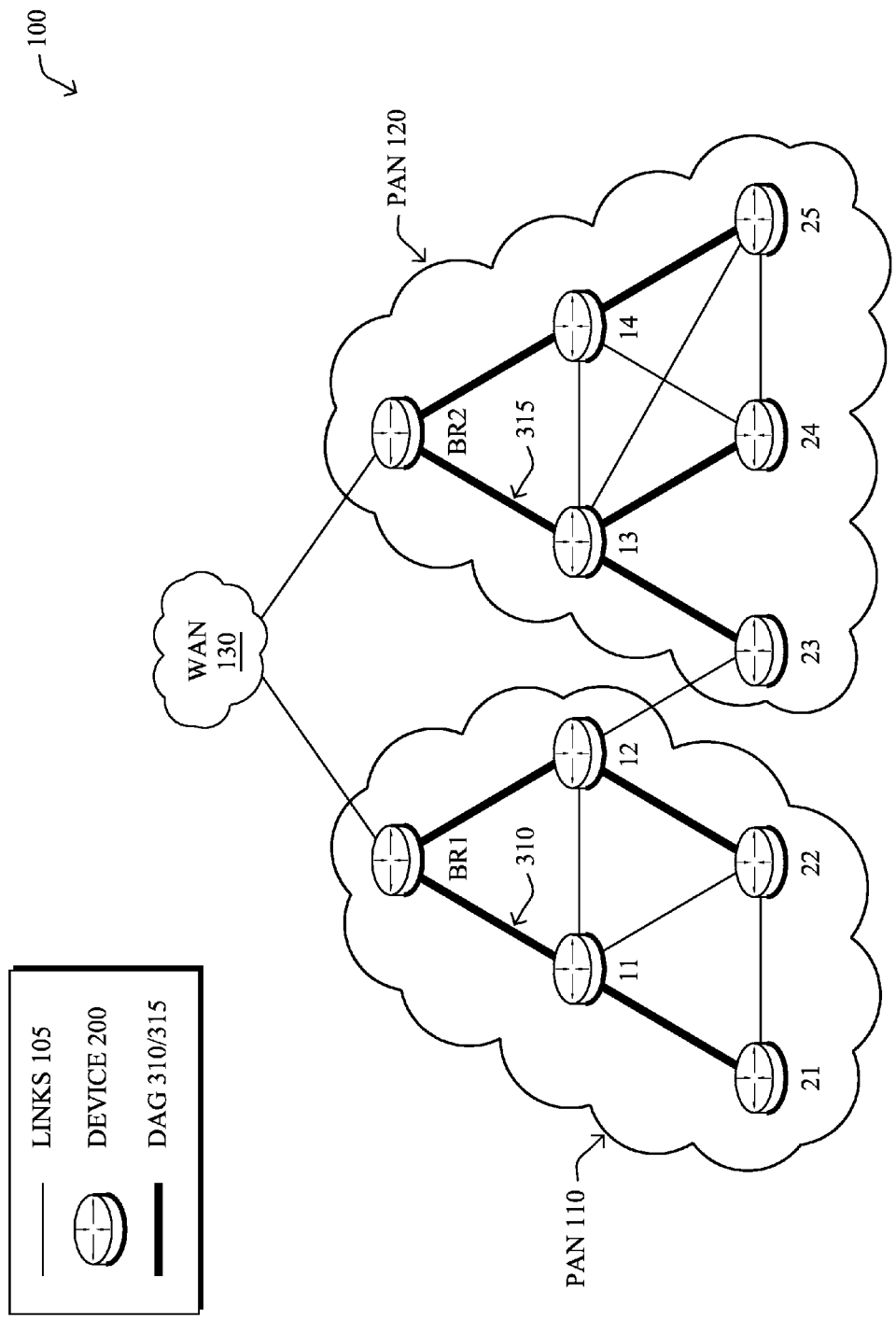
Figure 5D:
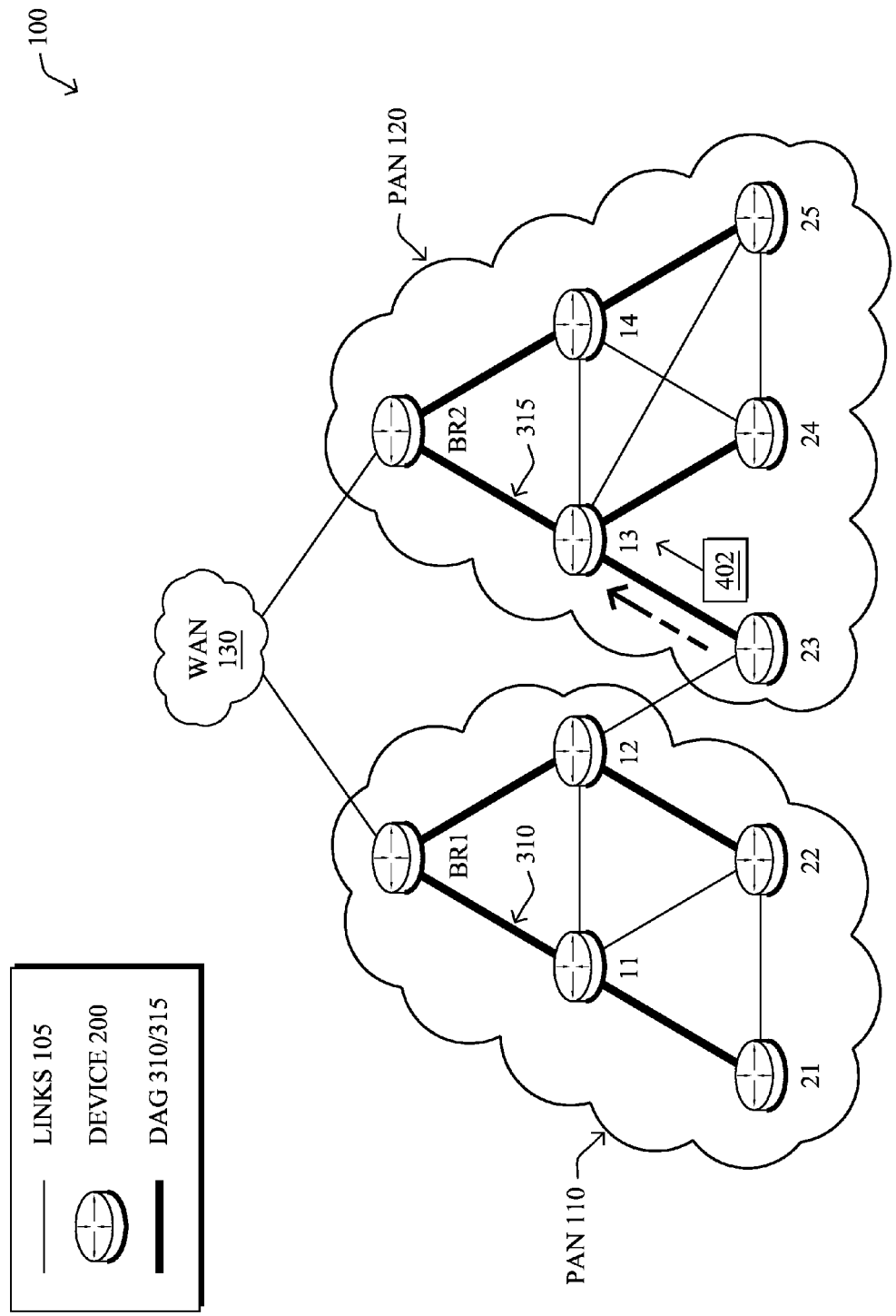

In response to receiving an instruction to join a different PAN, a network node may change its PAN identifier and begin participating in the new routing domain. For example, as shown in FIGS. 5B-5C, node 23 may join PAN 120, in response to receiving migration instruction 502 from border router BR1. In doing so, as shown in FIG. 5D, node 23 may now send messages 402 to node 13 within the same PAN 120, either directly or via one or more other nodes in PAN 120. Consequently, messages 402 may exhibit better performance metrics (e.g., reduced latency, fewer packet drops, etc.) and border routers BR1 and BR2 may experience reduced loads attributable to the reduction of the inter-PAN traffic.

In some embodiments, a node instructed to join a different PAN may be configured to always favor the specified PAN, if available. However, if the node cannot detect any neighboring nodes that also belong to the specified PAN, the node may revert to searching for the best available PAN (e.g., based on any of the performance metrics the node would typically use to determine which PAN to join). In another embodiment, the PAN migration instruction received by the node may include one or more conditions that must be satisfied before the node uses the PAN specified by the instruction. For example, migration instruction 502 sent to node 23 may include a maximum routing stretch or path cost (e.g., number of hops, latency, etc.) between node 23 and border router BR2 in PAN 120 that should be tolerated. If the specified cost is exceeded in PAN 120, node 23 may attempt to join a different PAN, in an attempt to reduce this cost.

Figure 6A:
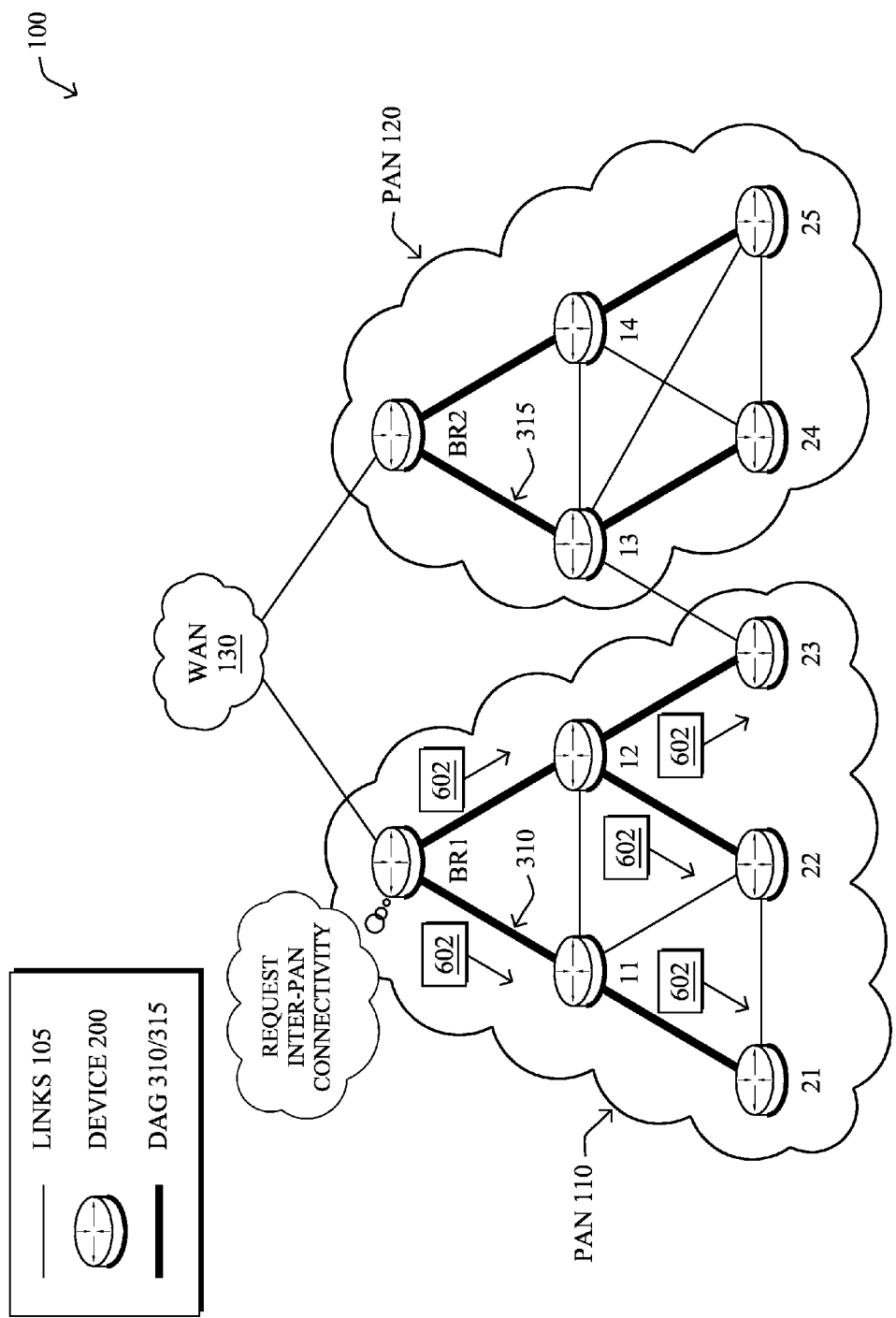
FIGS. 6A-6C illustrate a network device requesting neighbor data from PAN nodes.
Figure 6B:
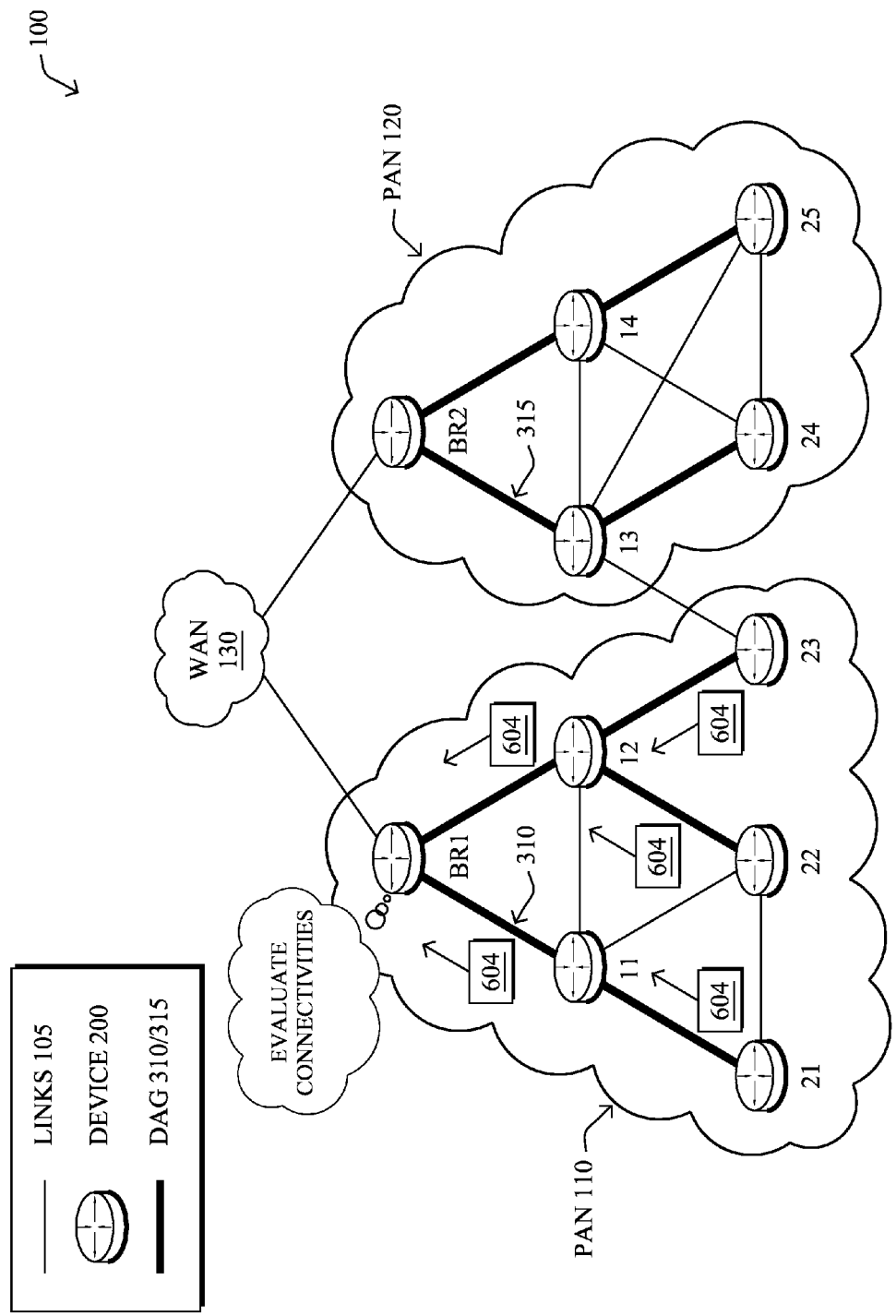

Depending on the routing protocol used, a border router or other network device may or may not have information regarding node adjacencies that cross different PANs. In some embodiments, the device may request neighbor adjacency information from the various nodes. For example, as shown in FIG. 6A, border router BR1 may send neighbor data requests 602 to the various nodes (e.g., all nodes in PAN 110, any nodes in PAN 110 that send or receive inter-PAN traffic, any nodes in PAN 110 that send or receive critical inter-PAN traffic, etc.). In response to receiving requests 602, as shown in FIG. 6B, the nodes may send messages 604 back to border router BR1 that include neighbor data regarding the nodes' individual connectivities to their neighboring devices. For example, message 604 from node 23 may indicate to border router BR1 that node 13 within PAN 120 is also a neighbor of node 23.

Figure 6C:
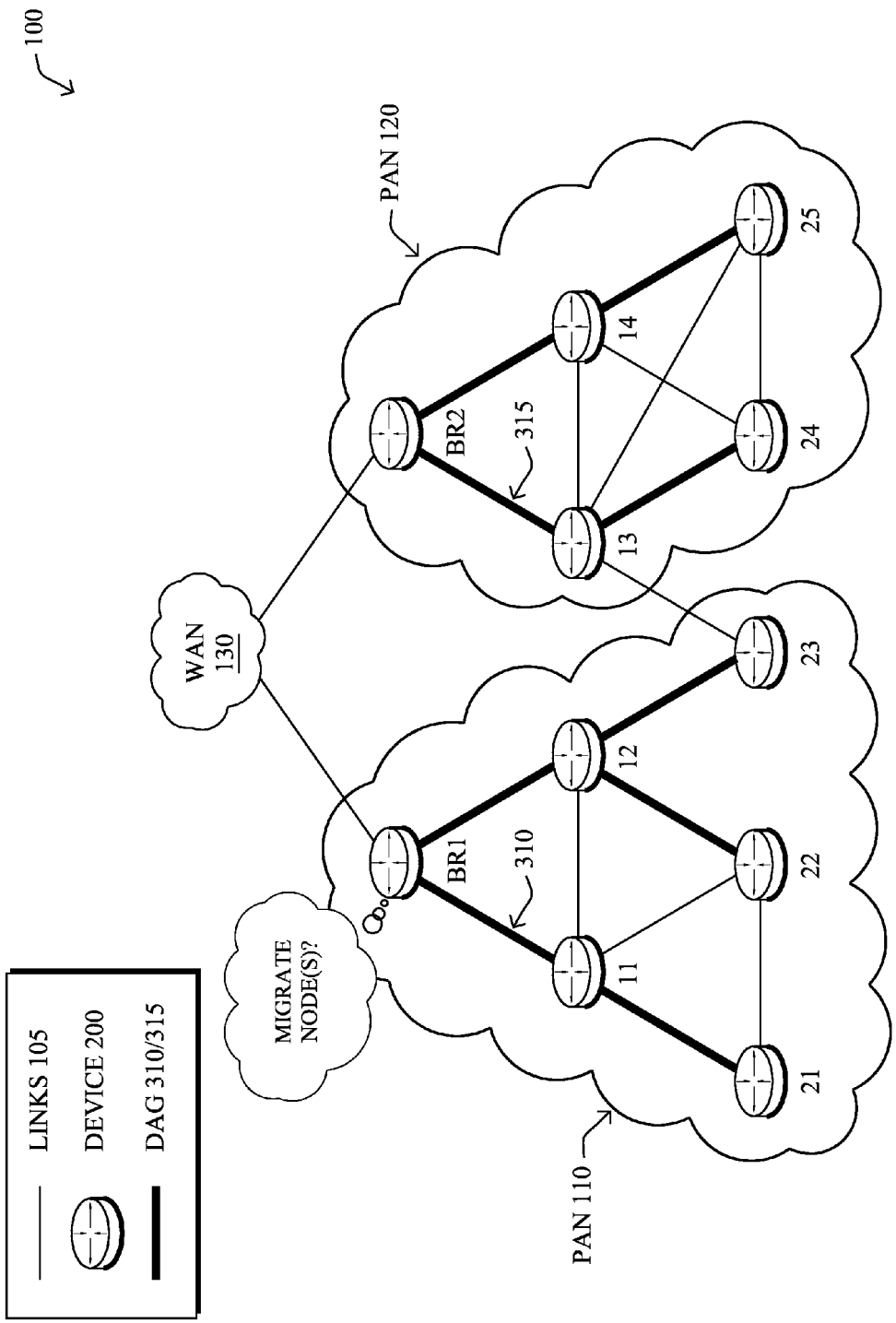

Border router BR1 may use received neighbor data to determine whether one or more of the nodes in PAN 110 should be migrated to a different PAN, as shown in FIG. 6C. For example, border router BR1 may use the neighbor data to calculate a path cost stretch for each node generating or receiving inter-PAN P2P traffic. Indeed, if node 23 in PAN 110 reports that it can see node 13 in PAN 120 and the path cost stretch of routing via border router BR1 is too high then border router BR1 may request a PAN migration. In further embodiments, border router BR1 may instruct multiple nodes to migrate to a different PAN (e.g., a sender or addressee of the inter-PAN traffic, as well as one or more intermediary nodes). For example, assume that node 23 is not a neighbor of node 13, but that node 12 instead neighbors node 13. In such a case, border router BR1 may determine that both nodes 12 and 23 are associated with the critical inter-PAN traffic sent from node 23 and should both be migrated to PAN 120, based on the calculated path cost stretch associated with such a migration.

Figure 7:
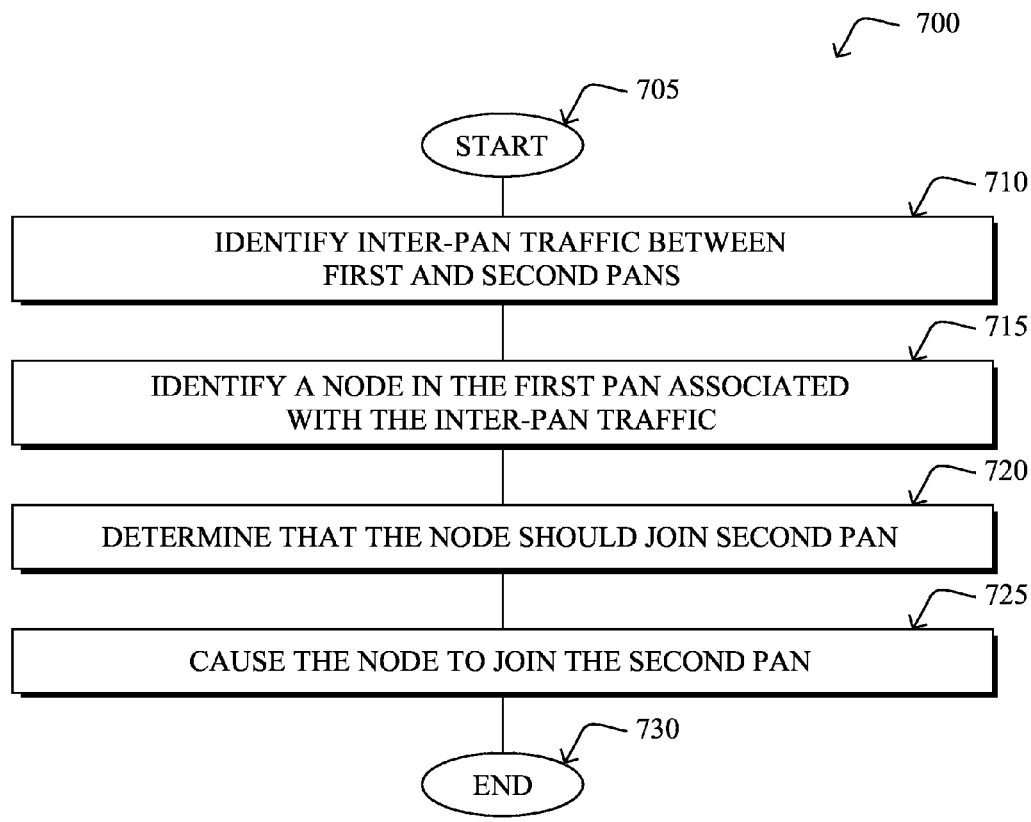
FIG. 7 illustrates an example simplified procedure for optimizing inter-PAN traffic.

FIG. 7 illustrates an example simplified procedure 700 for optimizing inter-PAN traffic in a network, in accordance with one or more embodiments described herein. The procedure 700 may start at step 705, and continues to step 710, where, as described in greater detail above, a network device (e.g., device 200) identifies inter-PAN traffic between a first PAN and a second PAN. Such a device may be, for example, a border router of the first PAN that provides connectivity between the first PAN and the second PAN (e.g., directly, via an intermediary WAN, etc.). In other words, any inter-PAN traffic may flow through the border router. In various embodiments, the network device may maintain a traffic matrix of the inter-PAN traffic flowing through the network device and use the traffic matrix to identify inter-PAN traffic.

At step 715, as described in greater detail above, the network device identifies a node in the first PAN associated with the inter-PAN traffic. For example, the network device may analyze the inter-PAN traffic to identify the address of the sender node or addressee node of the inter-PAN traffic. In further cases, the network device may identify any intermediary nodes along the path used by the sender node to reach the addressee node (e.g., by analyzing the inter-PAN traffic, the DAG used within the PAN, etc.).

At step 720, the network device determines that the identified node should join the second PAN, as detailed above. In various embodiments, the network device may analyze neighbor data regarding any potential neighbors of the node(s) associated with the inter-PAN traffic, to determine whether any of the nodes should be migrated to the second PAN. For example, if the sender of the inter-PAN traffic is also a neighbor of a node that is a member of the second PAN, the network device may determine that the sender should join the second PAN and instead send the traffic to the neighbor. In further cases, the network device may determine that multiple nodes should migrate to the second PAN (e.g., if the end-point node of the inter-PAN traffic is not a direct neighbor of any nodes in the second PAN).

At step 725, as described in greater detail above, the network node causes the network node(s) from step 720 to join the second PAN. In various embodiments, the device may send an instruction to the node(s) that identifies the second PAN. In some embodiments, the instruction may also include one or more performance threshold used by the node to determine whether or not to use the second PAN. For example, the instruction may specify a maximum path cost for the path between the network node and a border router of the second PAN (e.g., number of hops, etc.). If the path cost to the node within the second PAN exceeds this maximum path cost, the network node may instead use a different PAN. Procedure 700 then ends at a step 730.

Figure 8:
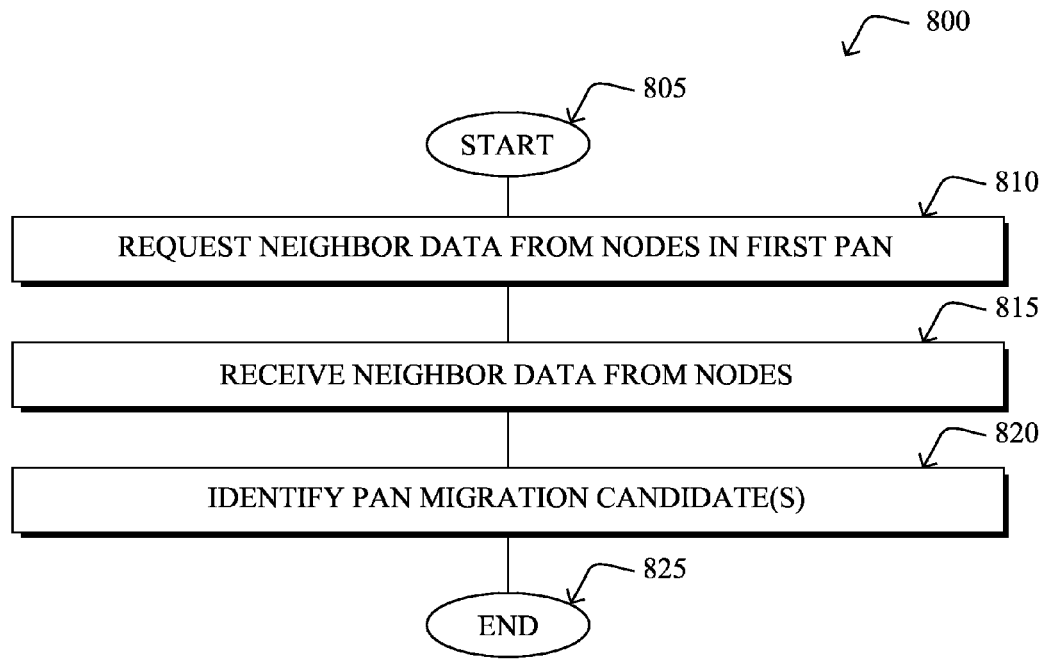
FIG. 8 illustrates an example simplified procedure for identifying one or more inter-PAN migration candidates.

FIG. 8 illustrates an example simplified procedure 800 for identifying one or more inter-PAN migration candidates, in accordance with one or more embodiments described herein. Procedure 800 may start at step 805, and continues to step 810 where, as described in greater detail above, a network device requests neighbor data from one or more network nodes associated with inter-PAN traffic. For example, if a particular network node in a first PAN is generating critical inter-PAN traffic, a border router of the PAN may request neighbor data from the node regarding any nodes to which the network node can communicate.

At step 815, as described in greater detail above, the network device (e.g., border router, etc.) receives the neighbor data requested in step 810. In various embodiments, the neighbor data may include identifiers for the one or more neighbors of the node (e.g., nodes that are within physical and/or transmission proximity of the node). In some cases, the neighbor data may also include performance metrics regarding the link between the network node and its neighbors. For example, in some cases, the network node may use IEEE 802.15.4 Enhanced Beacons for purposes of discovering any neighbor adjacencies and the properties of the corresponding links to the neighbors.

At step 820, as highlighted above, the network device may identify one or more PAN migration candidates based on the received neighbor data. In some embodiments, a network node in a first PAN that originates or receives inter-PAN traffic may be a PAN migration candidate if the device neighbors a node that belongs to the source or destination PAN associated with the traffic. In further embodiments, an intermediary node along the path used to convey the inter-PAN traffic may be identified as a PAN migration candidate if the node borders the source or destination PAN associated with the traffic. In some cases, the network device that identifies PAN migration candidates may base the identification on performance metrics included in the neighbor data. For example, the network device may only migrate nodes if the impending performance metrics after the migration satisfy one or more performance criteria (e.g., the network device may only cause the node or nodes to migrate if the performance of the migration is within an acceptable range). Procedure 800 then ends at step 825.

Figure 9:
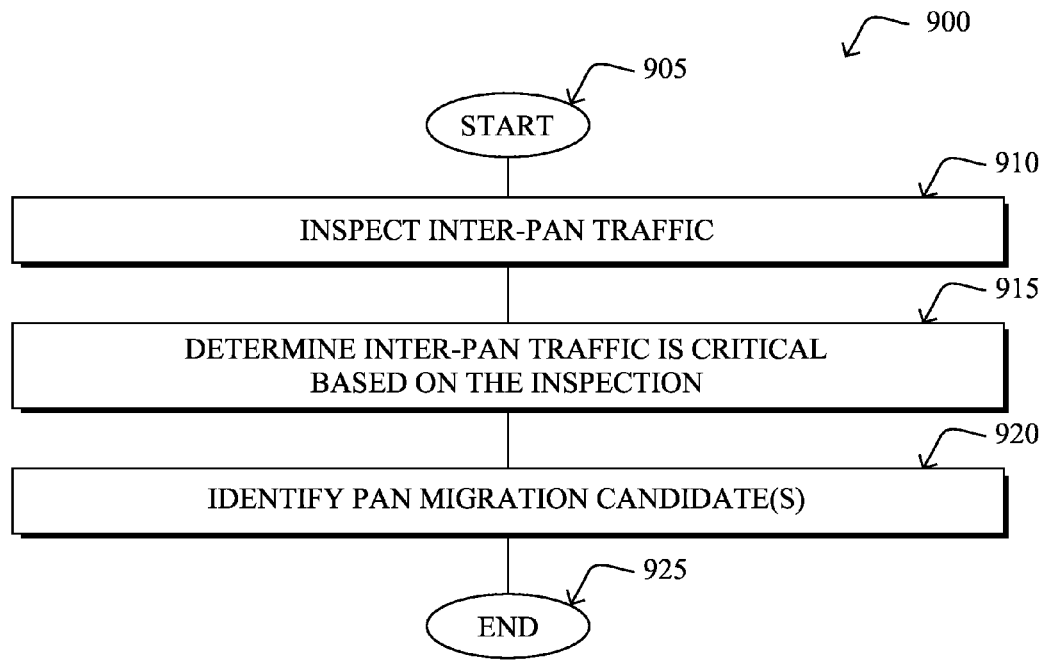
FIG. 9 illustrates an example simplified procedure for determining that an inter-PAN migration should be performed.

FIG. 9 illustrates an example simplified procedure for determining that an inter-PAN migration should be performed, in accordance with one or more embodiments described herein. The procedure 900 may start at step 905, and continues to step 910, where, as described in greater detail above, a network device (e.g., network device 200) inspects inter-PAN traffic. In various embodiments, the network device may inspect the address of the source and/or destination of the traffic (e.g., the UDP port used by the source or destination, etc.), any quality of service (QoS) or DSCP parameters included in the traffic's packets, a recognized pattern of bytes in the messages, the contents of the traffic's packets (e.g., using deep packet inspection), combinations thereof, or the like.

At step 915, as described in greater detail above, the network device determines that the inter-PAN traffic is critical based on the inspected inter-PAN traffic. For example, in some cases, the network device may determine that the traffic is associated with a critical application (e.g., a control system implemented by deploying a plurality of distributed automation devices, etc.) based on the UDP port(s) used to convey the traffic, any QoS or DSCP parameters included in the traffic, or any other information obtained by inspecting the inter-PAN traffic.

At step 920, the network device identifies one or more PAN migration candidates, in response to determining that the inter-PAN traffic is critical, as detailed above. Such candidates may include, for example, an endpoint device that sends or receives the inter-PAN traffic (e.g., the sender or addressee of the traffic). In further cases, a PAN migration candidate may include one or more intermediary nodes along the path traversed by the inter-PAN traffic, if the candidate endpoint node itself is not able to directly join the corresponding other PAN. As noted previously, migrating the candidate node(s) to the other PAN may reduce the respective loads on the border routers of the PANs, as well as improving the performance metrics of the traffic (e.g., by reducing the number of hops traversed by the traffic, etc.). Procedure 900 then ends at step 925.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, provide for the optimization of inter-PAN traffic by causing one or more network nodes associated with the traffic to join the other PAN, thereby reducing the routing stretches traversed by the traffic (e.g., by sending the traffic as inter-PAN traffic instead of routing the traffic as intra-PAN traffic through connected border routers). This is likely to reduce the number of packet drops experienced by the traffic, which may adversely affect the underlying process associated with the traffic (e.g., a distributed automation control process, etc.). Such a PAN migration is further likely to improve the overall latency, WAN traffic costs, and congestion experienced by the border router(s) of the respective PANs.

While there have been shown and described illustrative embodiments that provide for optimizing inter-PAN traffic in a network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly. Further, the term "PAN" is used herein synonymously with a routing domain and, as such, should not be viewed as limited to LLNs. Also, while the techniques generally describe initiation and determinations by a head-end node (e.g., a border router of a PAN), a network management system/server (NMS) may also be used to provide intelligence to the network functions described herein, such that the NMS may analyze the inter-PAN traffic and may select which nodes are to migrate to a different PAN.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, by a device between a first inter-personal area network (PAN) and a second PAN, inter-PAN traffic being sent between the first PAN and the second PAN, wherein the device is a border router;
   identifying, by the device, a network node in the first PAN associated with the inter-PAN traffic;
   determining, by the device, that the network node should join the second PAN; and
   causing, by the device, the network node to join the second PAN, in response to determining that the network node should join the second PAN.

2. The method as in claim 1, further comprising:
   requesting, by the device, neighbor data from a plurality of nodes in the first PAN, wherein the plurality of nodes includes the network node;
   receiving, at the device, the requested neighbor data from the plurality of nodes, wherein neighbor data from a particular node indicates a set of one or more nodes that are directly reachable by the particular node; and
   wherein determining, by the device, that the network node should join the second PAN comprises determining a set of one or more PAN migration candidate nodes from among the plurality of nodes that can reach the second PAN based on the neighbor data received from the one or more PAN migration candidate nodes.

3. The method as in claim 1, further comprising:
   inspecting, by the device, the inter-PAN traffic; and
   determining, by the device, that the inter-PAN traffic is associated with a critical application based on the inspected inter-PAN traffic, wherein the device determines that the network node should join the second PAN, in response to determining that the inter-PAN traffic is associated with a critical application.

4. The method as in claim 1, wherein determining that the network node should join the second PAN comprises:
   determining that a performance metric of the inter-PAN traffic associated with the network node crosses a performance threshold.

5. The method as in claim 4, wherein the performance threshold is based on a service level agreement (SLA) associated with the inter-PAN traffic.

6. The method as in claim 1, wherein causing the network node to join the second PAN comprises:
sending, by the device, an instruction to the network node that includes an identifier for the second PAN.

7. The method as in claim 6, wherein the instruction includes a maximum path cost associated with the identifier for the second PAN, wherein the network node uses a different PAN than the second PAN when a path cost for a path between the network node and a border node of the second PAN exceeds the maximum path cost.

8. The method as in claim 7, wherein the maximum path cost is based on a service level agreement (SLA) associated with the inter-PAN traffic.

9. An apparatus, comprising:
one or more network interfaces to communicate with a computer network;
a processor coupled to the one or more network interfaces and configured to execute one or more processes; and
a memory configured to store a process executable by the processor, the process when executed operable to:
identify inter-personal area network (PAN) traffic being sent between a first PAN and a second PAN, wherein the apparatus is a border router between the first PAN and the second PAN;
identify a network node in the first PAN associated with the inter-PAN traffic;
determine that the network node should join the second PAN; and
cause the network node to join the second PAN, in response to determining that the network node should join the second PAN.

10. The apparatus as in claim 9, wherein the process when executed is further operable to:
request neighbor data from a plurality of nodes in the first PAN, wherein the plurality of nodes includes the network node;
receive the requested neighbor data from the plurality of nodes, wherein neighbor data from a particular node indicates a set of one or more nodes that are directly reachable by the particular node; and
wherein the apparatus determines that the network node should join the second PAN by determining a set of one or more PAN migration candidate nodes from among the plurality of nodes that can reach the second PAN based on the neighbor data received from the one or more PAN migration candidate nodes.

11. The apparatus as in claim 9, wherein the process when executed is further operable to:
inspect the inter-PAN traffic; and
determine that the inter-PAN traffic is associated with a critical application based on the inspected inter-PAN traffic, wherein the device determines that the network node should join the second PAN, in response to determining that the inter-PAN traffic is associated with a critical application.

12. The apparatus as in claim 9, wherein the apparatus determines that the network node should join the second PAN by:
determining that a performance metric of the inter-PAN traffic associated with the network node crosses a performance threshold.

13. The apparatus as in claim 12, wherein the performance threshold is based on a service level agreement (SLA) associated with the inter-PAN traffic.

14. The apparatus as in claim 9, wherein the apparatus causes the network node to join the second PAN by:
sending an instruction to the network node that includes an identifier for the second PAN.

15. The apparatus as in claim 14, wherein the instruction includes a maximum path cost associated with the identifier for the second PAN, wherein the network node uses a different PAN than the second PAN when a path cost for a path between the network node and a border node of the second PAN exceeds the maximum path cost.

16. The method as in claim 15, wherein the maximum path cost is based on a service level agreement (SLA) associated with the inter-PAN traffic.

17. A tangible, non-transitory, computer-readable media having software encoded thereon, the software when executed by a processor on a device in a computer network operable to:
identify, at a device between a first inter-personal area network (PAN) and a second PAN, traffic being sent between the first PAN and the second PAN, wherein the device is a border router;
identify a network node in the first PAN associated with the inter-PAN traffic;
determine that the network node should join the second PAN; and
cause the network node to join the second PAN, in response to determining that the network node should join the second PAN.

18. The computer-readable media as in claim 17, wherein the software when executed is further operable to:
request neighbor data from a plurality of nodes in the first PAN, wherein the plurality of nodes includes the network node;
receive the requested neighbor data from the plurality of nodes, wherein neighbor data from a particular node indicates a set of one or more nodes that are directly reachable by the particular node; and
wherein the device determines that the network node should join the second PAN by determining a set of one or more PAN migration candidate nodes from among the plurality of nodes that can reach the second PAN based on the neighbor data received from the one or more PAN migration candidate nodes.

19. The computer-readable media as in claim 17, wherein the software when executed is further operable to:
inspect the inter-PAN traffic; and
determine that the inter-PAN traffic is associated with a critical application based on the inspected inter-PAN traffic, wherein the device determines that the network node should join the second PAN, in response to determining that the inter-PAN traffic is associated with a critical application.

20. The computer-readable media as in claim 17, wherein the device determines that the network node should join the second PAN by:
determining that a performance metric of the inter-PAN traffic associated with the network node crosses a performance threshold.

* * * * *